(12) United States Patent
Leban et al.

(10) Patent No.: US 6,236,407 B1
(45) Date of Patent: May 22, 2001

(54) METHOD FOR CREATING GRAPHICAL IMAGES

(76) Inventors: Bruce Leban, 10417 165th Pl. NE.; Roy A Leban, 2865 W. Lake Sammamish Pkwy. NE., both of Redmond, WA (US) 98052; Kenneth E Jordan, 1719 Riggs Pl. NW., Washington, DC (US) 98052

( * ) Notice: Subject to any disclaimer, the term of this patent is extended or adjusted under 35 U.S.C. 154(b) by 0 days.

(21) Appl. No.: 09/113,541

(22) Filed: Jul. 10, 1998

Related U.S. Application Data

(60) Provisional application No. 60/052,110, filed on Jul. 10, 1997, provisional application No. 60/052,162, filed on Jul. 10, 1997, and provisional application No. 60/052,112, filed on Jul. 10, 1997.

(51) Int. Cl.[7] ................................................ G06T 11/00
(52) U.S. Cl. ........................................................ 345/433
(58) Field of Search .................................. 345/433, 434, 345/436, 437–439

(56) References Cited

U.S. PATENT DOCUMENTS

| | | | |
|---|---|---|---|
| 5,745,122 | * 4/1998 | Gay et al. | 345/433 |
| 5,808,623 | * 9/1998 | Hamburg | 345/433 |
| 5,809,179 | * 9/1998 | Marimont et al. | 382/254 |
| 5,959,633 | * 9/1999 | McFarland et al. | 345/441 |

* cited by examiner

Primary Examiner—Matthew Luu
Assistant Examiner—J. F. Cunningham

(57) ABSTRACT

The present invention is a process for creating custom graphical images. A computer user activates the process by selecting a base image or set of base images. The base images may be chosen from a library of such images or created by the user directly. The user also specifies a plurality of user data items. These items may include text to be inserted into the custom image, the font, size or style of the text, the desired size of the custom image or other data items specific to the image, such as the color of particular parts. The custom image is then created by configuring transformation operations based on the user supplied data, applying the transformation operations to the base images and assembling the transformed base images to create the custom image. This custom image can then be used by the user in any way that an image created directly by them could be used.

5 Claims, 4 Drawing Sheets

METHOD FOR CREATING GRAPHICAL IMAGES

This application claims the benefit of US provisional application Ser. No. 60/052,110 entitled "Process for recognizing and manipulating automatic document attributes" filed Jul. 10, 1997, Ser. No. 60/052,162 entitled "Process for creating custom graphical images" filed Jul. 10, 1997 and "Improved option selection control" Ser. No. 60/052,112 filed Jul. 10, 1997.

The present invention is a process for creating custom graphical images. A computer user activates the process by selecting a base image or set of base images. The base images may be chosen from a library of such images or created by the user directly. The user also specifies a plurality of user data items. These items may include text to be inserted into the custom image, the font, size or style of the text, the desired size of the custom image or other data items specific to the image, such as the color of particular parts. The custom image is then created by configuring transformation operations based on the user supplied data, applying the transformation operations to the base images and assembling the transformed base images to create the custom image. This custom image can then be used by the user in any way that an image created directly by them could be used.

DETAILED DESCRIPTION OF THE PREFERRED EMBODIMENT

The invention has been embodied in a computer software product designed for electronic publishing with the trade name "Globetrotter" and it is that embodiment that is described here as the preferred embodiment. The advantages of the invention are best seen by first discussing the problems with prior art methods of customizing an image.

The present invention is a method whereby a computer system may automatically create custom images configured by user data items. Without the present invention, custom images are created by artists. If 10 similar custom images are desired, the artist must create 10 separate images. With the present invention, the artist can create a small number of base images and use the present invention to create the 10 custom images. If 100 custom images are desired, without the present invention, the artist will have to create 90 more images. With the present invention, the artist will not have to do any additional work.

Figure 1:
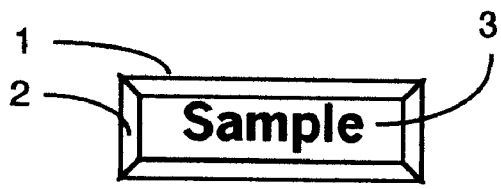
FIG. 1 shows a base image used to illustrate the invention.

FIG. 1 shows an image, comprising an rectangle 1 with bevels 2 composed with the word "Sample" 3. This is representative of one of the kinds of image we might wish to customize, but the image itself is not part of the invention, nor is the invention limited to this kind of image. The invention transforms images to produce other images and we will illustrate the invention using this image.

Figure 2:
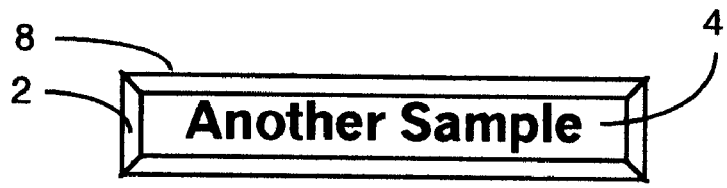
FIG. 2 shows a custom image created by the invented process from the image in FIG. 1.

FIG. 2 shows a custom image created by the invented process from the image in FIG. 1. The process of creating this particular image comprises the following steps:

A1. Start with the original image shown in FIG. 1. This image consists of two base images, the rectangle 1 and the text 3.

Figure 3:
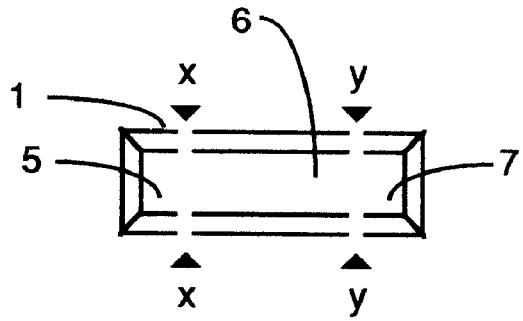
FIG. 3 shows an intermediate step in the process of creating FIG. 2.

A2. Partition the rectangle into three parts 5, 6 and 7 as illustrated in FIG. 3. The image was cut along the lines indicated by the two pairs of points denoted x and y in the figure.

A3. Measure the replacement text "Another Sample" 4 and determine the difference between the length of the original text and the replacement text, in this case 60 points.

A4. Expand the text image by 60 points and insert the replacement text 4.

A5. Apply a linear transformation to the middle part of the image 6 to stretch it by 60 points.

A6. Reassemble the three parts 5, 6 and 7 to produce a larger rectangle 8 that is 60 points larger.

A7. Assemble the larger text image 4 and the larger rectangle 8 to produce the final image.

Figure 4:
FIGS. 4, 5 and 6 each show the result of using a different inferior process to create a custom image.
Figure 5:
Figure 6:

These are the actual steps taken to create the image in FIG. 2, rather than the general process defined by the present invention In the above case, each of the above steps is essential to produce the correct result. In other cases, a different set of steps may be required. FIG. 4 shows the result of omitting steps A4 and A5 and leaving the rectangle at its original size. This image is undesirable and does not resemble an image that might be created by an artist because the text is not contained in the rectangle as intended. FIG. 5 shows the results of omitting step A4 and applying the linear transformation to the entire rectangle 1. This image is undesirable because the bevels 2 have been distorted. FIG. 6 shows the results of omitting step A3 and leaving the text image at its original size. This image is undesirable because in order to fit the text inside the image it has been excessively condensed.

The general process comprises the following steps:

B1. Start with (1) an original image consisting of a plurality of base images and (2) a plurality of user data items.

B2. Partition the base images into a plurality of image parts.

B3. Configure a plurality of transformation operations to be performed on each part based on the user data items. Configure an order in which these operations are to be performed.

B4. Perform the first transformation operation that has not yet been performed.

B5. Reconfigure the transformation operations based on the user data items and the results of all previously completed transformation operations.

B6. Repeat steps B4 and B5 until all transformation operations have been performed.

B7. Create a new image by reassembling the image parts.

The specific example given above is an instance of this general process. Step A1 corresponds to step B1; step A2 corresponds to step B2; step A3 corresponds to step B3; step A4 corresponds to step B4; step A5 corresponds to steps B5 and B6/B4; step A6 and A7 correspond to step B7.

There are a variety of transformation operations that can be performed on an image or image part, including but not limited to:

Replace the text in the image part.

Change the font, size or style of the text in the image part.

Change the color of an image part.

Stretch the image part in a linear or non-linear fashion.

Replicate the image part a plurality of times (e.g., as stripes).

Replicate a plurality of image parts a plurality of times (e.g., as a checkerboard).

Discard the image part that exceeds the desired size.

Rotate, skew or otherwise distort an image part.

Select an image part from a set of image parts based on the values of user data items.

Choose a transformation operation based on the values of user data items.

Apply a sequence of transformation operations.

Apply the above process (B1–B7) recursively.

A further variation is that in addition to the different transformation operations available, each may be applied to different kinds of image data, including, but not limited to, vector, bit-map and text data. In transforming vector data, the endpoints of lines are expanded. After the endpoints are transformed, the lines between them are redrawn. In transforming bit-map data, each individual point is transformed to a new position and points are interpolated as necessary to create a solid image. There are a variety of interpolation methods in the art, including the method known as "anti-aliasing".

A variation of the process is as follows: Given an integer N, perform steps B1–B7 N times, each time with a text data item corresponding to the string representation of a different number from 1 to N. The string representation of numbers might be "1", "2", "3", etc. or some other representation such as theater numbers "A", "B", "C", etc. or roman numerals "I", "II", "III", etc. This variation is particularly useful for numbered lists.

The last listed transformation operation above ("Apply the above process recursively") is of particular importance since it allows the process to expand much more complicated images than might otherwise be possible. To be more precise, the process can be described as:

B1. Start with (1) an original image consisting of a plurality of base images and (2) a plurality of user data items.

B2. Partition the base images into a plurality of image parts.

B3. Configure a plurality of transformation operations to be performed on each part based on the user data items. Configure an order in which these operations are to be performed.

B4. Perform the first transformation operation that has not yet been performed. If this is a recursive transformation:

B4.1. Start with (1) the image parts being transformed and (2) a plurality of user data items.

B4.2. Partition the base images into a plurality of image subparts.

B4.3. Configure a plurality of transformation operations to be performed on each subpart based on the user data items. Configure an order in which these operations are to be performed.

B4.4. Perform the first transformation operation that has not yet been performed.

B4.5. Reconfigure the transformation operations based on the user data items and the results of all previously completed transformation operations.

B4.6. Repeat steps B4 and B5 until all transformation operations have been performed.

B4.7. Create a new image by reassembling the image subparts.

B5. Reconfigure the transformation operations based on the user data items and the results of all previously completed transformation operations.

B6. Repeat steps B4 and B5 until all transformation operations have been performed.

B7. Create a new image by reassembling the image parts.

Applying this process recursively may be repeated to any desired level of complexity. Furthermore, step B6 specifies that the performance of transformation operations is to be repeated a plurality of times. A single transformation operation may not produce an image that is exactly the final desired size. For example, if we replicate an image part, it might be the case that we can only make the image larger than desired or smaller than desired. We can apply one transformation operation to expand the image as close to the approximate size as possible and a second transformation operation to expand it to the exact size (perhaps expanding a different part of the image). Alternatively, we can apply one transformation operation to the image part to expand it to an exact divisor of the desired size and a second transformation operation to replicate the image part a plurality of times.

We might also apply one set of transformation operations to expand the image horizontally and another set of transformation operations to expand the image vertically, or we can apply three sets of transformation operations to produce a 3D image. It is generally more convenient to think of this as adding another step, however, the actual transformation performed in both cases would be the same:

B8. Apply steps B1–B7 once for each desired set of transformations.

The above discussion referred to "configure a plurality of transformation operations to be performed on each part based on the user data items" but did not explain how these configurations were determined. The exact process of configuring the transformation operations depends on the selected base images. The artist creating the set of base images must make certain designations that determine which transformation operations are used. Each transformation is assigned both a priority level and a sequence order. Transformations with the same priority are considered together when determining how much each part of the image should be expanded or reduced. The general process is as follows:

C1. Determine the desired final size. This may be specified directly by the user or it may be an artist-designated function of the user data items.

C2. Determine the difference between the original size of the base image and the desired final size. If this difference is positive, use the artist-designated transformation operation for expansion. If this difference is negative, use the artist-designated transformation operation for reduction.

C3. For all transformation operations not yet completed and designated to be performed at the lowest level of priority, divide the differences among these transformation operations according to artist-designated mathematical formulas.

For example, in the image of FIG. 1, the final size of the figure would be expressed by the formulas:

height=28 pt.

width=width(text)+36 pt.

The designated transformation for the left part 4 and right part 6 is to not perform any transformation. The designated transformation for the middle part 5 is to apply a linear transform. The designated transformation for the text part is to expand the area by the specified amount. The difference assigned to the middle part and to the text part is 100% of the difference determined in step C2. In this specific case, the formulas specify horizontal expansion but no vertical expansion.

Figure 7:
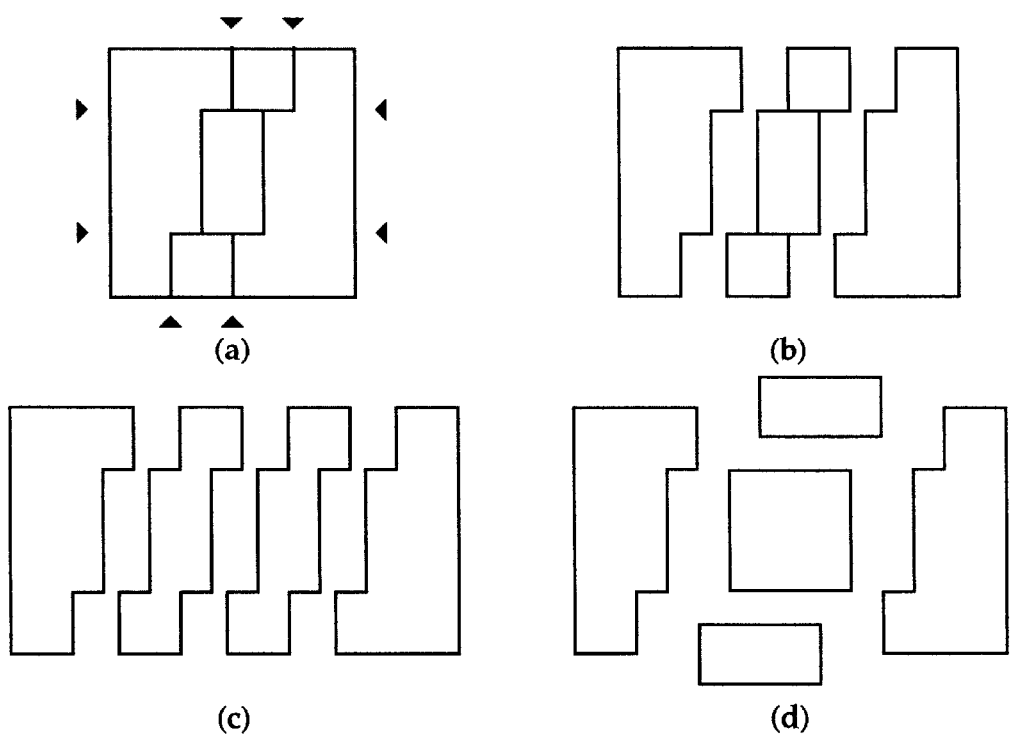
FIG. 7 shows the application of an irregular orthogonal cut: (a) and (b) show a square cut into five pieces; (c) shows replication of the pieces; and (d) shows a linear transformation of the pieces.
Figure 8:
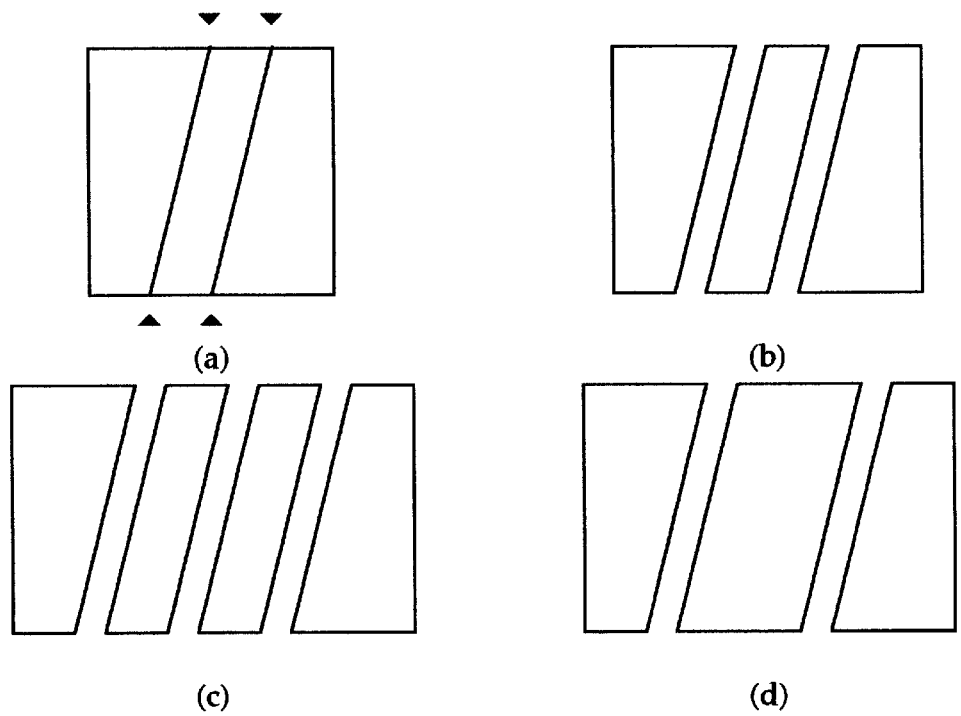
FIG. 8 shows the application of a non-orthogonal cut: (a) and (b) show a square cut into three pieces; (c) shows replication of the pieces; and (d) shows a linear transformation of the pieces.

For simplicity, the examples in FIGS. 1–6 do not illustrate the full complexity of images that can be transformed by this process. It is important to note that this process is not limited to simple horizontal or vertical straight cuts. FIGS. 7 illustrates an irregular cut. FIGS. 7(a) and 7(b) show the original square cut into 5 parts. FIG. 7(c) shows how these parts can be replicated to expand the image. FIG. 7(d) shows how these parts can be linearly transformed to expand the image. FIG. 8 illustrates a non-orthogonal cut. FIGS. 8(a) and 8(b) show the original square cut into 3 parts. FIG. 8(c) shows how the central part can be replicated to expand the image. FIG. 8(d) shows how the central part can be stretched to expand the image. This stretching operation can be accomplished by two linear transforms (scaling plus skewing).

Figure 9:
FIG. 9 shows an application of the cuts shown in FIGS. 7 and 8.

For simplicity, FIGS. 7 and 8 do not show any detail of the image within the square. Obviously, if the square was featureless as shown then all of these expansions would produce the same result. The partitions of the base image would be chosen based on the actual detail of the image and the desired result. FIG. 9 shows a base image where partitions similar to those shown in FIGS. 7 and 8 might be appropriate. FIG. 9(a) shows the base image and FIG. 9(b) shows a transformed version of this image.

Figure 10:
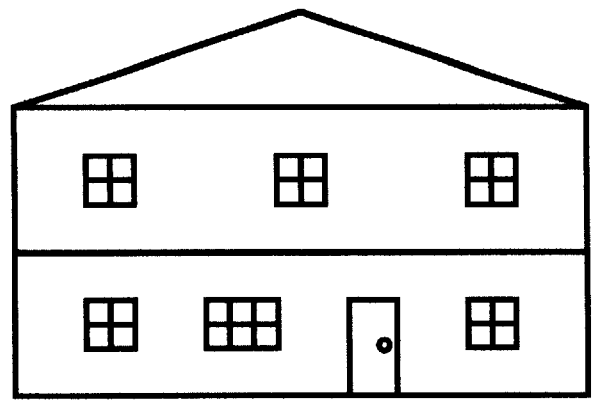
FIG. 10 shows a house.
Figure 11:
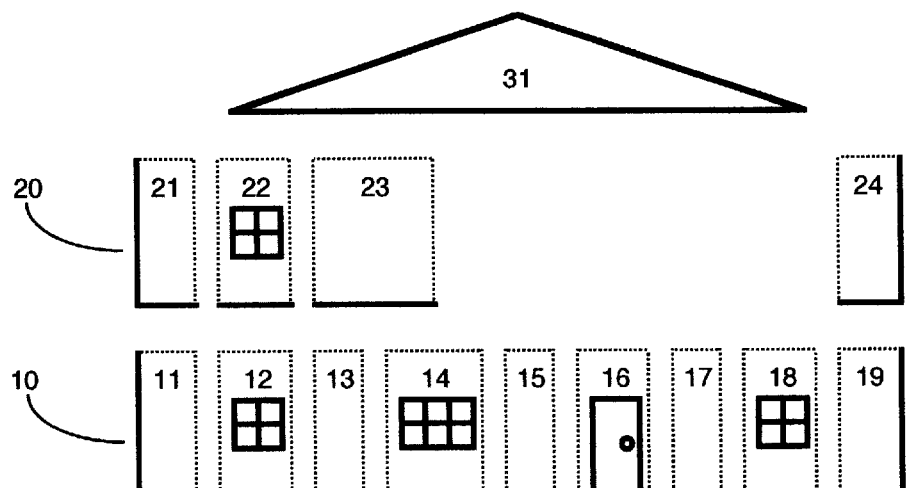
FIG. 11 shows the partition of the house into image parts.

As a final example, FIG. 10 shows a house. FIG. 11 shows the partition of the house into image parts 11–19, 21–24 and 31. The dotted lines in this figure indicate the shape of each part and do not indicate part of the image. The house is partitioned vertically into two floors, 10 and 20, and the roof 31. The first floor 10 is partitioned into 9 parts 11–19. The second floor 20 is partitioned into 4 parts 21–24. The roof 31 is not partitioned.

The house is transformed by applying the process to the image parts shown in FIG. 11 as follows. First the house is transformed vertically by repeating the second floor as many times as necessary:

$$house = 10 + f \times 20 + 31$$

choosing n to be the largest integer such that $$h10 + f \times h20 + h31 \leq h0$$

where h10 and w10 denote respectively the height and width of image part 10, and h0 and w0 denote respectively the desired height and width of the house.

The first floor is then transformed as follows:

$$10 = 11 + i(12+13) + j(14+15) + k(16) + l(17+18) + 19$$

where i j, k and l are determined as follows. First, k is chosen (priority 1) such that k is the largest integer in the set {0,1} such that $$w11 + k(w16) + w19 \leq w0$$

Second, j is chosen (priority 2) such that j is the largest integer in the set {0,1} such that $$w11 + j(w14 + w15) + k(w16) + w19 \leq w0$$

Third, l is chosen (priority 3) such that l is the largest integer in the set {0,1} such that $$w11 + j(w14 + w15) + k(w16) + l(w17 + w18) + w19 \leq w0$$

Fourth, i is chosen (priority 4) such that i is the largest integer such that $$w11 + i(w12 + w13) + j(w14 + w15) + k(w16) + l(w17 + w18) + w19 \leq w0$$

Next, the width of subparts 13,15 and 17, if any, is determined to be:

$$w13 = w15 = w17 \leftarrow \frac{w0 - w11 - i \times 12 - j \times w14 - l \times w18 - w19}{i + j + l}$$

If there are no subparts 13,15 and 17 (i.e., $i+j+l=0$), then the width of subparts 11 and 19 is determined to be:

$$w11 = w19 \leftarrow (w0 - k \times w16) \div 2$$

The first floor is created by assembling the subparts in the order specified above, replicating parts 12 and 13 i times, parts 14 and 15 j times and parts 17 and 18 k times. Parts 13, 15 and 17 are transformed by applying a linear transform to scale the parts to the desired width.

The second floor is transformed similarly:

$$20 = 21 + m(22) + n(23+22) + 24$$

The third floor is transformed by as follows. The height of the roof is determined to be $$h31 \leftarrow h0 - h10 - n \times h20$$

A linear transform is applied to the roof to scale it to the determined height. The entire house is created by assembling the transformed first floor 10, f replicated copies of the transformed second floor 20 and the transformed roof 31.

Figure 12:
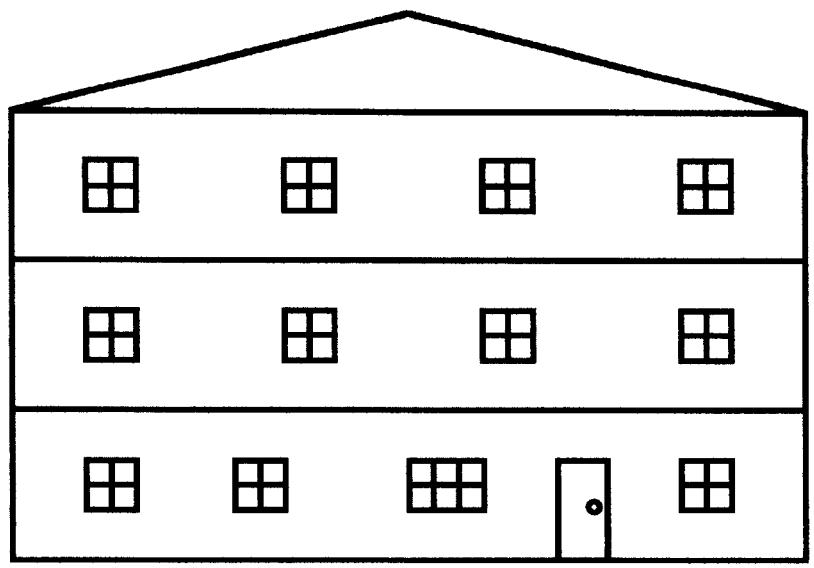
FIGS. 12, 13 and 14 show three different custom images derived from the image of FIG. 11 using the invented process.
Figure 13:
Figure 14:
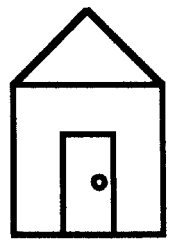

FIGS. 12, 13 and 14 show three different custom images derived from the original using this process. The user data items provided in these examples are the desired final size of the house.

The artist does not need to write equations like those given above, although an embodiment of the invention may allow the author to do that. Instead, the above equations can be derived automatically given the order in which image parts are to be assembled, the priority to be given to each part, and the transformations to be applied to these parts.

As with the previous examples, this example is intended to illustrate the general process and the specific image and formulas given in this example should not be taken to limit the invention to those formulas. The invention comprises the process of applying formulas like these to one image to produce another image.

The image size is related to the image resolution. In order to produce the highest quality final image, in some cases the image must be produced at a finer resolution than is actually desired. An alternative to producing the image at a finer resolution is to produce the image at a larger size. In the memory of a computer system, an image that is twice as large is indistinguishable from one that has twice the resolution. When creating an image, the artist may designate that images at finer resolutions are to be transformed as if they were being produced at a larger size (allowing more detail in the image) or that they are to be transformed based on the actual size of the final image. The difference is apparent in an example like FIGS. 10–14 where the former case would produce more smaller windows and the latter case would produce fewer larger windows.

Figure 15:
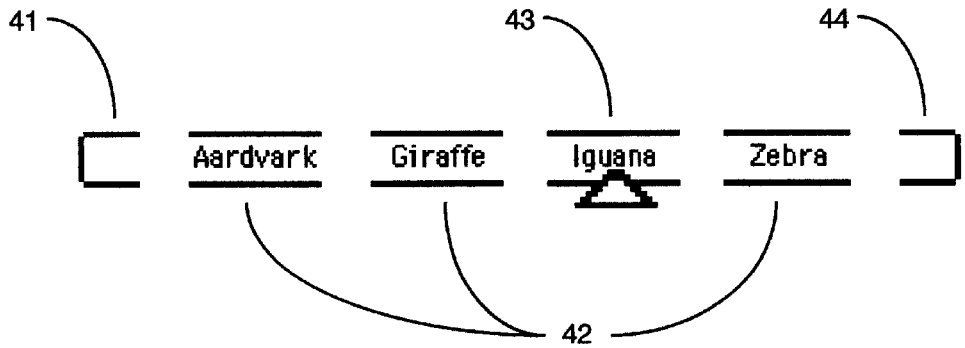
FIG. 15 shows an image created using the invented process such as might be used for a selection control or navigation bar.

FIG. 15 shows an image that might be used for a selection control or navigation bar. In this case, there are a plurality of different images generated for each item in the bar. Rather than each image being based on the same base image, each image is based on a different part of the base image. When these images are used a different image 43 is used for the selected image than for the other images 42. In addition, extra images are generated for use as end-caps when the images are displayed contiguously. In this particular case, all the other images 42 are based on an identical part of the base image, but they need not be.

Specific variations of the process that are part of this invention:

Transforming an image to create a new image with different text, as in FIGS. 1–2.

Transforming an image to create a new image of a different size, as in FIGS. 10–14.

Transforming an image to create a new image by partitioning an image into subparts, transforming the parts and reassembling the image.

Transforming an image to create a new image by transforming a plurality of base images and then assembling the base images to create the final image.

Transforming an image to create a new image using the transformation operations listed previously.

Transforming an image to create a set of similar images.

Transforming an image to create a set of similar images where the images form a sequence, e.g., numbered.

Transforming an image to create a set of images each of which comprises a portion of the original image.

A computer system or software program capable of performing these processes.

A computer system or software program that performs computations intended to produce the same result as the calculation of the formulas. For example, in the house example, a computer system or software program could avoid using mathematical formulas by trying all possible values for i, j and k until it finds the largest values that fit. This is just a less direct and slower way of solving the formulas.

A computer system or software program capable of creating base images, specifying partitions of images into subparts and specifying formulas for configuring the transformations of the subparts.

A computer system or software program capable of creating base images, specifying partitions of images into subparts and specifying formulas for configuring the transformations of the subparts that allows a user to enter these specifications by drawing a base image, marking the base image where it should be partitioned, selecting transformation options through a user interface, and capable of storing this specification so it can be used to create a custom image.

Any combination of the above.

We claim:

1. A method of creating graphical images from a plurality of base images, a plurality of transformation operations, each transformation operation operating on a plurality of image parts, and a plurality of user data items, each item having an associated value, comprising the steps of:

(1) selecting a plurality of base images;

(2) partitioning each base image into a plurality of image parts;

(3) selecting a desired size of the created image;

(4) determining a difference between a original size of the base image and the desired size;

(5) selecting a plurality of transformation operations, these operations being selected from a set of possible operations and a plurality of the operations in this set being selectable according to the values of a plurality of the user data items and the determined difference;

(6) assigning a priority value to each transformation operation;

(7) dividing the determined difference among the transformation operations according to the priority values;

(8) configuring an order of the transformation operations according to the values of a plurality of the user data items and the determined and divided differences;

(9) configuring the transformation operations according to the values of a plurality of the user data items and the determined and divided differences;

(10) configuring the image parts that each transformation operation will apply to according to the values of a plurality of the user data items and the determined and divided differences;

( 11) repeating the following sub-steps until all transformations have been applied:

(11.1) performing a first transformation operation that has not yet been performed;

(11.2) reconfiguring the remaining transformation operations according to the values of a plurality of the user data items and the determined and divided differences and the results of the previously performed transformation operations;

(12) create a new image by reassembling the image parts.

2. The method of claim 1 wherein the possible transformation operations further comprise the method of claim 7 and step 11.1 further comprises:

if the selected transformation operation is the method of claim 7, apply the method of claim 7 recursively by returning to step 1, continuing to step 12 and then returning to step 11.2.

3. The method of claim 1 wherein the possible transformation operations further comprise:

replacing the text in an image part;

changing the appearance of the text in an image part;

changing the color of an image part;

stretching an image part in a linear fashion;

stretching an image part in a non-linear fashion;

replicating an image part a plurality of times;

replicating a plurality of image parts a plurality of times;

discarding an image part that exceeds a desired size;

rotating an image part;

skewing an image part;

distorting an image part;

selecting an image part from a set of image parts based on the value of a plurality of the user data items and the determined and divided differences; and choosing a transformation operation based on the values of a plurality of the user data items and the determined and divided differences.

4. The method of claim 1 wherein the user data items further comprise a set of alternatives, each alternative comprising a plurality of data values for corresponding user data items and the method further comprises:

creating a graphical image for each alternative in the set by applying the method of claim 7 once for each alternative using the designated data values.

5. The method of claim 1 further comprising the steps of using a computer system to:

create base images by drawing them;

partition the base images into subparts by marking the base image;

select transformation operations and formulas for determining the values of user data items through a user interface; and applying the method of claim 7 to produce a custom image.

* * * * *